(12) United States Patent
Stevens et al.

(10) Patent No.: US 8,777,123 B2
(45) Date of Patent: Jul. 15, 2014

(54) METHOD, SYSTEM OR APPARATUS FOR APPLYING A FLUID TO AT LEAST A PORTION OF A FLOOR SURFACE OF A COVERED AREA VIA A MOVEABLE FLUID APPLICATION STRUCTURE

(75) Inventors: Duane P. Stevens, Bend, OR (US); Duane L. Walker, Sweet Home, OR (US)

(73) Assignee: Arena Dust Control Innovation, LLC, Bend, OR (US)

( * ) Notice: Subject to any disclaimer, the term of this patent is extended or adjusted under 35 U.S.C. 154(b) by 644 days.

(21) Appl. No.: 12/606,081

(22) Filed: Oct. 26, 2009

(65) Prior Publication Data

US 2011/0095094 A1    Apr. 28, 2011

(51) Int. Cl.
| | |
|---|---|
| B05B 15/10 | (2006.01) |
| B05B 15/06 | (2006.01) |
| B05B 3/00 | (2006.01) |
| B05B 3/18 | (2006.01) |

(52) U.S. Cl.
USPC ............... 239/1; 239/208; 239/209; 239/210; 239/743; 239/744; 239/751

(58) Field of Classification Search
USPC ............. 239/1, 208, 209, 210, 722, 723, 726, 239/729, 730, 732, 735, 739, 740, 743, 744, 239/748, 750, 751, 737
See application file for complete search history.

(56) References Cited

U.S. PATENT DOCUMENTS

| | | | | |
|---|---|---|---|---|
| 910,400 | A * | 1/1909 | Lischer | 239/208 |
| 4,074,856 | A * | 2/1978 | Williams et al. | 239/1 |
| 4,723,714 | A * | 2/1988 | Lucas | 239/744 |
| 4,842,204 | A * | 6/1989 | Debruhl, Jr. | 239/744 |
| 5,085,374 | A * | 2/1992 | Okuda et al. | 239/751 |
| 6,698,668 | B2 * | 3/2004 | Stehling | 239/172 |
| 7,104,220 | B1 * | 9/2006 | Mack et al. | 119/436 |

* cited by examiner

*Primary Examiner* — Ryan Reis
(74) *Attorney, Agent, or Firm* — Berkeley Law & Technology Group, LLP

(57) ABSTRACT

Embodiments of methods, systems, or apparatuses relating to applying a fluid to at least a portion of a floor surface of a covered area via a moveable fluid application structure.

21 Claims, 3 Drawing Sheets

METHOD, SYSTEM OR APPARATUS FOR APPLYING A FLUID TO AT LEAST A PORTION OF A FLOOR SURFACE OF A COVERED AREA VIA A MOVEABLE FLUID APPLICATION STRUCTURE

BACKGROUND

1. Field

The subject matter disclosed herein relates to methods, systems, or apparatuses relating to applying a fluid to at least a portion of a floor surface of a covered area via a moveable fluid application structure.

2. Information

Covered areas, such as buildings, equine arenas, stadiums, or the like, may employ many techniques to deliver fluids (e.g., water, dust control agents, insecticides, etc.) to their floor surfaces. Certain covered areas may employ fixed overhead systems, such as sprinklers. Other techniques may include using trucks that spray fluid which drive on the floor surface, or ground sprinklers positioned on the floor surface which may be fixed or move as they dispense fluid.

These various approaches, however, may be associated with various undesirable characteristics. For instance, fixed overhead systems may produce fluid spray patterns that are uneven, such as producing fluid overlaps or dry spots. Likewise, ground systems may produce similar undesirable characteristics and may be labor intensive. Accordingly, other approaches or techniques that may potentially improve fluid application characteristics may be desirable.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
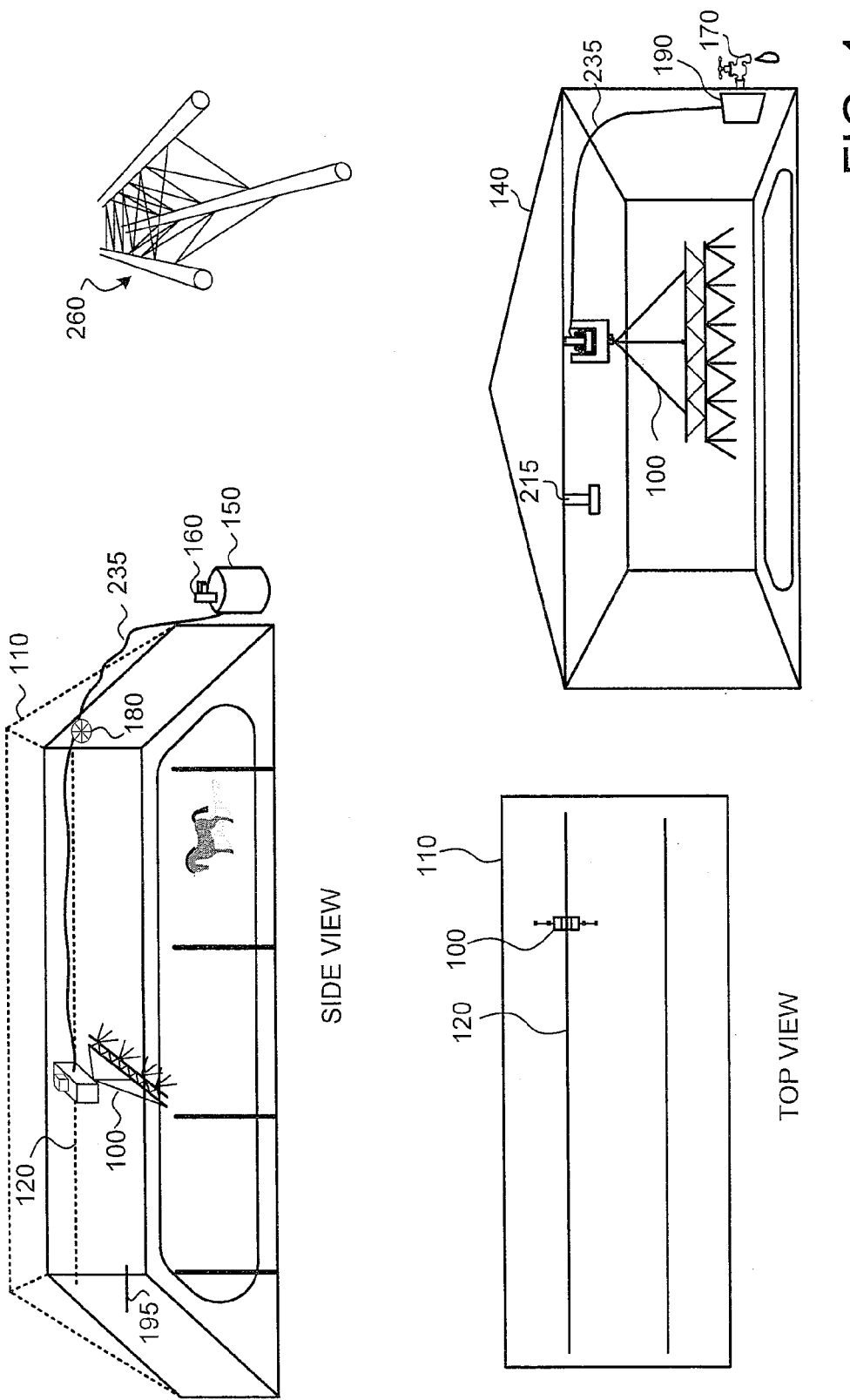
FIG. 1 is a schematic diagram depicting an embodiment of an exemplary apparatus for applying a fluid to at least a portion of a floor surface of various exemplary covered areas via a moveable fluid application structure.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

In addition, reference is made in the following detailed description to the accompanying drawings, which form a part hereof, wherein like numerals may designate like parts throughout to indicate corresponding or analogous elements. It will be appreciated that for simplicity or clarity of illustration, elements illustrated in the figures have not necessarily been drawn to scale. For example, the dimensions of some of the elements may be exaggerated relative to other elements for clarity. Further, it is to be understood that other embodiments may be utilized and structural or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and examples, illustrations, or the like, do not limit the scope of claimed subject matter defined by the appended claims and their equivalents.

As mentioned previously, covered areas, such as buildings, equine arenas, stadiums, or the like, may employ many techniques to deliver fluids (e.g., water, dust control agents, insecticides, etc.) to their floor surfaces. Some sample techniques may include employing fixed overhead sprinkler systems, spray trucks which drive on a floor surface, ground sprinklers, or the like. Applying fluid to a floor surface of a covered area may serve many purposes, some of which may depend on the nature of the area, its purpose, the composition of its floor surface, or many other factors.

To illustrate, in an equine or livestock arena context, as just an example, one purpose of delivering fluid to its floor surface may be to mitigate the effects of airborne particles, such as dust. Airborne particles may be associated with various health or safety concerns. For instance, particulate matter on a floor surface of a covered area may be disturbed by human or animal activity, or natural factors, such as wind, for example. These disturbed particles may become airborne particles which, if ingested, inhaled, and/or the like, may be associated with health risks for both humans and animals, particularly respiratory health risks. For instance, airborne particles, such as dust, may cause or aggravate health conditions such as asthma, pneumonia, heaves, allergies, chronic obstructive pulmonary disease (or "COPD"), and/or the like. Thus, one purpose of applying a fluid to a floor surface, at least in an equine or livestock arena context, may be to mitigate the effects of airborne particles presenting a hazard to human or animal health. Of course, there may be numerous other reasons to apply a fluid to a floor surface, such as to mitigate insects, water flora, or apply a floor treatment, as just some examples.

As mentioned previously, various approaches to apply a fluid to a floor surface of a covered area may be associated with various undesirable characteristics. For instance, fixed overhead systems may produce fluid spray patterns that are uneven, such as producing fluid overlaps or dry spots, as just an example. Thus, in this example, a fixed overhead approach may be less than desirable since it may apply too much fluid for a particular purpose to a particular floor portion, or too little fluid for a particular purpose to another floor portion. This may be hazardous in some contexts, such as in an equine or livestock arena context, as just an example, since too much fluid may result in human or animal slippage, which may occasion injury or death, and/or too little fluid may not mitigate dust concerns, such as those mentioned previously. Also, fixed overhead systems may require labor to smooth, or more uniformly apply a fluid to a particular floor surface.

Likewise, ground systems may produce similar undesirable characteristics. Sprinklers or water trucks, for example, may produce fluid overlaps or dry spots similar to those discussed above. In addition, the weight of water trucks may contribute to a breakdown of larger dirt particles into smaller particles, which may be more likely to become airborne if disturbed. Water trucks may also compact a floor surface unevenly, such as along the tire paths, which may make a surface more dangerous and/or onerous to use. Furthermore, a sprinkler or water truck approach may also require labor to smooth, or more uniformly apply a fluid to a particular floor surface, as just an example.

Due, in part, to concerns which may exist with one or more fluid application techniques, some of which are discussed above, the fluid application for a particular floor surface may occur too often, or not often enough, for a particular purpose. For example, in the case of the former, too much fluid may be used for a particular purpose, which may be more costly, wasteful, or environmentally harmful than a more desirable approach. In the case of the latter, some or all of the beneficial effects of fluid application, such as mitigating particulate matter that may be associated with one or more of the health risks mentioned previously, may not be realized, as just an example. Accordingly, other approaches or techniques that may potentially improve fluid application characteristics may be desirable.

With these and other concerns in mind, in accordance with certain aspects of the present description, example implementations may include methods, systems, or apparatuses for applying a fluid to at least a portion of a floor surface of a covered area via a moveable fluid application structure. For example, in certain implementations, a moveable fluid application structure may be suspended substantially above at least a portion of a floor surface of a covered area. This structure may be supplied a fluid, such as via a fluid transport structure (e.g., hose, tube, etc.) which may be coupled to a pressurized fluid source. Here, a moveable fluid application structure may move about one or more support elements, such as tracks, beams, or cables, as just some examples. In certain implementations, a fluid supplied to a moveable fluid application structure may be applied (e.g., sprayed) from a plurality of holes or nozzles of the structure as it moves substantially over a portion of a floor surface of a covered area. In certain embodiments, a relatively uniform spray of fluid may be applied to a particular portion of a floor surface. In other embodiments, however, a non-uniform spray of fluid may be applied to a particular portion of a floor surface. For example, in certain embodiments, fluid flow rates, spray patterns, or the like, may be adjusted to tailor or customize fluid quantities or spray patterns to a particular portion of a floor surface, ambient conduction (e.g., humidity), or the like. In certain implementations, one or more holes or nozzles of a moveable fluid application structure may vary in size, shape, or other qualities, to purposefully apply a fluid at various rates, patterns, or the like, as just an example.

FIG. 1 is a schematic diagram depicting an embodiment of exemplary apparatus for applying a fluid to at least a portion of a floor surface of exemplary covered area via a moveable fluid application structure. Equine arena 110 depicts a side view of an exemplary covered area. Of course, equine arena 110 is merely one exemplary type of covered area; accordingly, claimed subject matter is not limited to this example. Exemplary apparatus 100 is depicted movably coupled to one or more support elements installed to the structure of equine arena 110. Here, one or more support members of equine area 110, such as trusses or beams, for example, may support one or more support elements (e.g., tracks, beams, cables and/or the like) which may be specifically installed to support or guide apparatus 100. For example, a top view of equine arena 110 (at lower left of FIG. 1) depicts an exemplary configuration of tracks 120 which may be installed to support or guide apparatus 100, as just an example. In certain embodiments, one or more support elements may comprise existing support members, such as support members that support a covering (e.g., roof) of a covered area. For instance, building 140 depicts one or more beams 215 which may form at least a part of a roof structure for building 140, as just an example. Here, apparatus 100 may be movably coupled to one or more beams 215.

In certain embodiments, apparatus 100 may be positioned substantially above at least a portion of a floor surface of a covered area and may be capable of applying a fluid to a portion of a floor surface, such as a floor surface below, to the side, in front of, or behind apparatus 100, as just some examples, by applying (e.g., spraying) a fluid from a plurality of holes or nozzles as apparatus 100 moves substantially over a portion of a floor surface about one or more support elements. In certain embodiments, a fluid applied by apparatus 100 may comprise water, pesticides, insecticides, dust control agents, defoliants, and/or combinations thereof, as just some examples. A closer view of an exemplary moveable fluid application structure, such as apparatus 100, is depicted in FIG. 2.

Figure 2:
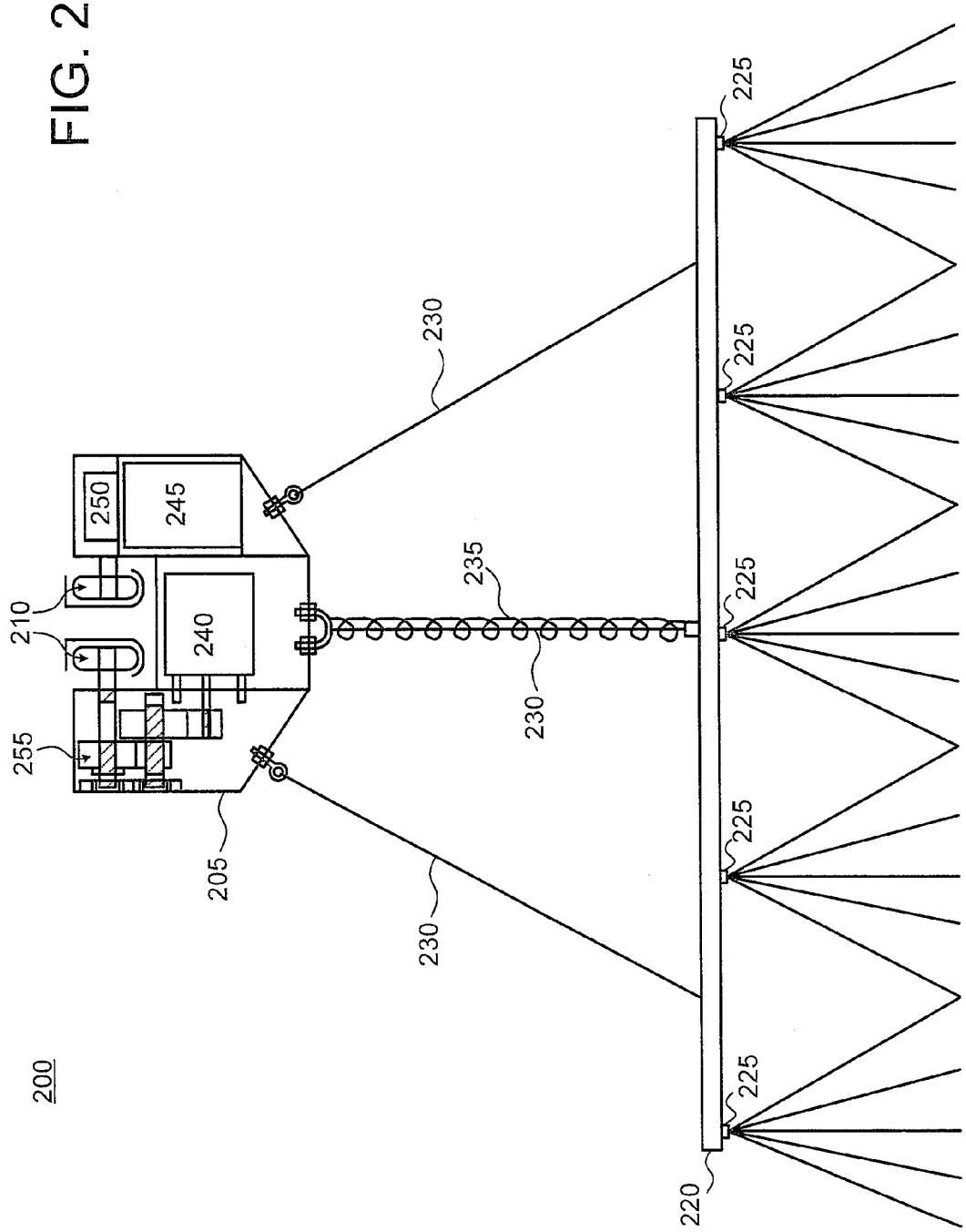
FIG. 2 illustrates a closer view of a particular exemplary apparatus for applying a fluid to at least a portion of a floor surface of a covered area via a moveable fluid application structure, according to an embodiment.

FIG. 2 illustrates a closer view of an exemplary apparatus for applying a fluid to at least a portion of a floor surface of a covered area via a moveable fluid application structure, according to an embodiment. For convenience, FIG. 2 depicts merely one exemplary embodiment of an apparatus capable of applying a fluid to at least a portion of a floor surface of a covered area. As such, apparatus 200 is, for illustrative purposes, depicted in a particular configuration with various illustrative devices or components. It is understood, however, that while this exemplary embodiment depicts only one configuration, and just a few associated devices or components, that any or all possible configurations, and numerous devices or components which may not be depicted, fall within the scope of claimed subject matter. Further, it should be understood that substitutions and equivalents of particular configurations, devices, components, or the like, may also fall within the scope of claimed subject matter.

In this embodiment, apparatus 200 is depicted with gear box 205. Here, gear box 205 may include or house one or more components which allow or create movement of apparatus 200 along one or more support elements. For example, in certain implementations, gear box 205 may include at least one motor 240 which is capable of providing force to move a moveable fluid application structure along one or more support elements. Thus, in certain embodiments, gear box 205 may have components, such as gears 255, which allow a force generated by one or more motors, such as motor 240, to drive one or more wheels, such as wheels 210. Accordingly, gear box 205 may comprise various gears or components which may control or adjust movements of a moveable fluid application structure, such as controlling speed, direction, and/or the like, about one or more support elements. In addition, in certain embodiments, gear box 205 may have components which permit a force generated by one or more motors to control an orientation of structure 220, such as allowing structure 220 to spin, tilt, retract, extend, raise, or lower, and/or the like, as non-limiting examples. Of course, in certain embodiments, a gear box may not be used. For example, in certain embodiments, movement of a moveable fluid application structure may occur via a pulley with a cable, as just one example.

In certain implementations, one or more motors, such as motor 240, may comprise an electric motor, a hydraulic motor, a pneumatic motor, a gear pump, and/or combinations thereof, as non-limiting examples. In a particular embodiment, for example, a moveable fluid application structure may include an electro-mechanical motor including a power source. Thus, in certain implementations, a moveable fluid application structure may include one or more batteries, such as battery 245, to supply power to one or more motors, as just an example. In other embodiments, other power sources, such as a 120-volt AC power source available in many conventional wall sockets, may be used, as yet another example.

In certain implementations, a motor may include a gear pump (not depicted) to allow or create movement of a moveable fluid application structure. For example, in a particular embodiment, a gear pump may allow or create movement using fluid pressure. Thus, as fluid is delivered to a moveable fluid application structure, such as described in more detail below, fluid pressure may be used, at least in part, by a gear pump to create or supply force to drive a moveable fluid application structure about one or more support elements and/or to drive or create one or more movements for structure 220. In addition, in certain embodiments, a moveable fluid application structure may be equipped with one or more valves, which may move to positions that may control a flow of fluid through a gear pump, such as to reverse the direction of motion of a moveable fluid application structure, as just an example. Of course, the above examples are merely illustrative of the scope of claimed subject matter and, accordingly, do not limit claim scope in any way.

In certain embodiments, a moveable fluid application structure may include various components or devices which may be used to control, support, or enhance the use of one or more motors. For example, in certain embodiments, a moveable fluid application structure may include one or more limit switches (not depicted). A limit switch may comprise an electrical, mechanical, proximity, photoelectric component, and/or the like, which may be triggered at a terminus of a path of movement, as just an example, so that motor direction may be reversed. Thus, if a moveable fluid application structure progressed to an end of a particular support element, a limit switch may trigger a motor to reverse direction and/or proceed to another support element, as non-limiting examples. Also, in certain embodiments, a limit switch may be used to power down a motor, such as when docking, for example.

Similarly, in certain embodiments, a limit switch, or other component, may trigger a docking operation. In certain embodiments, a docking operation may result in a retraction or tilting of at least a portion of a moveable fluid application structure such that it may be out of the way and/or less visibly intrusive of activities which may occur in the covered area. In certain embodiments, as just an example, a mechanical linkage or device 195 may push outwardly on the support cables 230 of a moveable fluid application structure. For instance, a moveable fluid application structure may move against a rigid linkage or device and/or a linkage or device may extend, which may force a portion of a moveable fluid application structure to move, such as retract or tilt, for example.

In addition, in certain embodiments, a moveable fluid application structure may include one or more time-delay relays, such as relay 250. In certain embodiments, a time-delay relay may be used in conjunction with a limit switch to delay a reversing motion of a motor, which may reduce "hammering" on the gears of the gear box, as just an example. In certain embodiments, one or more time-delay relays, limit switches, and/or the like, may be included with, or housed in, gear box 205. Of course, in certain embodiments, one or more components or devices referenced as being included with, or housed in, a gear box may be operability coupled to a moveable fluid application structure somewhere other than gear box 205. Thus, one or more components or devices may be coupled to a fluid application structure, a control box, or a covered structure itself, as just some examples.

FIG. 2 depicts structure 220 coupled to gear box 205 via support members 230. Here, structure 220 may comprise an elongated structure with a plurality of holes or nozzles 225 thereon. In certain embodiments, a function of structure 220 is to apply fluid to at least a portion of a floor surface of a covered area. Accordingly, to serve this function, structure 220 may take various shapes, sizes, or configurations. Thus, structure 220 depicted in FIG. 2 is merely demonstrative of one size, shape and configuration, according to an embodiment. As just an example, structure 220 may comprise triangular structure 260, such as depicted in FIG. 1, for example. This triangular structure may tend to reduce bowing, buckling and/or other stresses, as just an example. In certain embodiments, structure 220 may be configured like a truss structure, similar to a radio antenna, for example, or may simply be a tube drilled with holes, as yet another non-limiting example. Of course, as suggested above, structure 220 may take various shapes, sizes, or configurations. Accordingly, the scope of claimed subject matter is not to be limited in any way to these examples.

Here, structure 220 is depicted coupled to gear box 205. In addition, structure 220 is depicted coupled to gear box 205 via support members 230. Support members 230 may not only connect gear box 205 with structure 220, but may also be configured to provide support to parts of the fluid application structure to mitigate stress, add stability, control or resist spinning, raise or lower the structure, and/or for numerous other reasons. As mentioned previously, there are numerous, materials, sizes, configurations, etc., relating to how structure 220 may couple to gearbox 205, including various configurations of one or more support members, and it is again noted that apparatus 200 depicts only one exemplary embodiment. Accordingly, the scope of claimed subject matter is not limited to examples or illustrations.

Next, apparatus 200 depicts fluid transport structure 235. In certain embodiments, fluid transport structure 235 (e.g., hose, tube, etc.) may be capable of transporting a fluid from a fluid source to structure 220. In certain embodiments, fluid transport structure 235 may run only from a fluid source to gear box 205. In this instance, one or more support members, such as support members 230, may supply a fluid to structure 220, as just an example.

In certain embodiments, a fluid source may comprise a holding tank, a localized fluid source, such as a commercial or residential water supply, or the like, as non-limiting examples. In certain implementations, fluid sources which may not by themselves be capable of providing sufficient pressurized fluid may include one or more pumps to pressurize a fluid. To illustrate, referring back to FIG. 1, holding tank 150 may be a fluid source for apparatus 100 in equine arena 110. Here, holding tank 150 may include one or more pumps 160 to pressurize fluid in tank 150 or supply pressurized fluid to apparatus 100 via fluid transport structure 235, as just an example. In certain implementations, as a fluid is depleted from a tank, it may be replenished, at least in part, from other fluid sources. Here, a float switch (not depicted) may be used to control if or when other fluid sources may be used to replenish the fluid supply of a tank.

In certain embodiments, a pressurized fluid may be supplied to apparatus 100 from a localized fluid source, such as a residential or municipal water supply. For example, residential water source 170 depicted with building 140, may supply pressurized water to apparatus 100 via fluid transport structure 235, as just an example. In certain embodiments, pressures and flow rates (e.g., Gallons Per Minute or GPMs)

associated with a localized water source may not be sufficient to provide adequate pressure or fluid flow to apparatus 100. Accordingly, in certain embodiments, a localized fluid source may include one or more pumps to supplement or supply pressurized fluid, such as to increase a pressure of a fluid or increase GPMs, as just an example. Of course, while these examples use a residential water source as an example of one type of localized fluid source, it is noted that a localized fluid source may supply any type of fluid capable of being applied to at least a portion of a floor surface of a covered area. Accordingly, in certain embodiments, a localized fluid source may supply one or more fluids comprising water, pesticides, insecticides, dust control agents, defoliants, and/or combinations thereof, as non-limiting examples.

FIG. 1 depicts apparatus 100 with reel 180 coupled to a portion of equine arena 110. In certain embodiments, a reel may be coupled to apparatus 100 to house fluid transport structure 235 and/or wiring associated with one or more electrical components of apparatus 100, as just an example. Accordingly, in certain embodiments, where apparatus 100 moves about one or more support elements, a fluid transport structure, such as fluid transport structure 235, and/or miscellaneous wiring may extend or retract from a reel based, at least in part, on one or more movements of apparatus 100.

FIG. 1 depicts control box 190 electrically coupled to controls and/or switches that interact with apparatus 100. Here, control box 190 may include one or more electrical or mechanical components to at least in part control one or more operations of apparatus 100. Thus, for example, control box 190 may allow a user to manually turn various operations of apparatus 100 on or off, such as by pushing a button or flipping a switch. As yet another example, control box 190 may have one or more settings, such as a "heavy, medium, and light" setting, which are associated with the application of a certain quantity of fluid (e.g., by controlling or adjusting fluid pressure or flow rate), a frequency or duration of fluid application, or the like, as just a few examples. In certain embodiments, control box 190 may be hydraulically, mechanically, and/or otherwise coupled to apparatus 100. Here, for example, various operations of apparatus 100, and/or related operations, such as a water supply, hydraulic, and/or pneumatic motors or gear pump, may be controlled by one or more valves, switches, knobs, etc., at the control box, as just an example.

In certain embodiments, control box 190 may have one or more programmable circuits (not depicted), or sensors (not depicted) which may allow for control of apparatus 100. For instance, in certain embodiments, control box 190 may have a programmable circuit which may control, among other things, start or stop times of apparatus 100, a quantity of fluid application, or the like. Also, control box 190 may be electrically coupled to one or more sensors, such as infra-red sensors, motion sensors, acoustic sensors, or the like, which may provide substantially real-time information to control box 190 for various purposes. For instance, in certain embodiments, a sensor may detect that an object, such as an animal or human, may be within a path of a fluid application operation. Here, based at least in part on information from this sensor, control box 190 may suspend or cease a particular operation so as to not apply a fluid to the object, as just an example.

Figure 3:
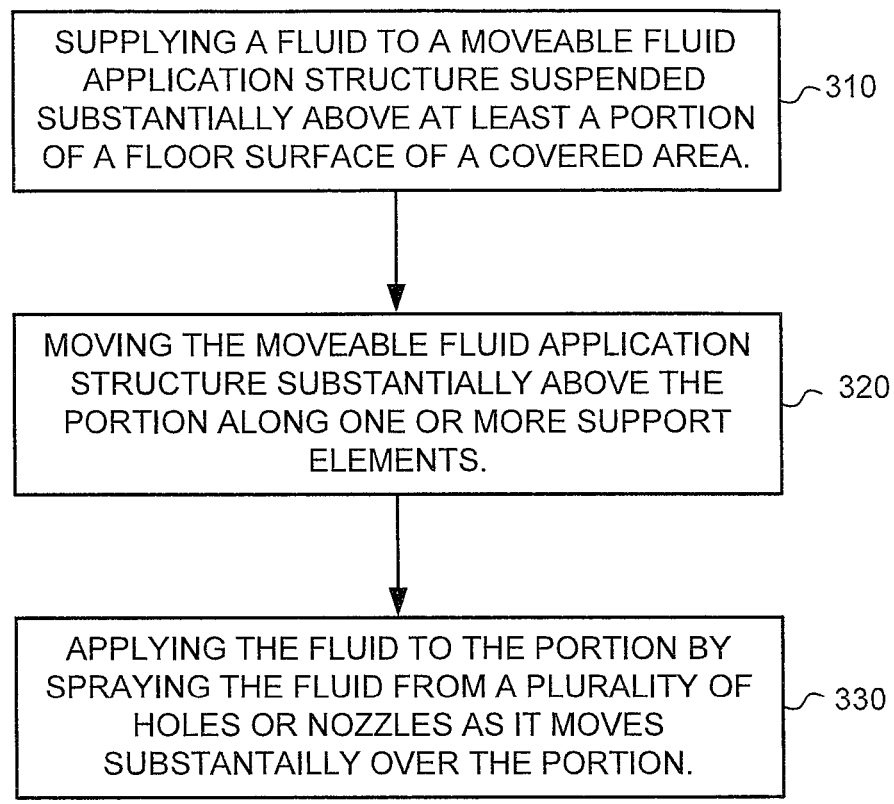
FIG. 3 is a flow diagram depicting an embodiment of an exemplary process for applying a fluid to at least a portion of a floor surface of a covered area via a moveable fluid application structure.

FIG. 3 depicts an embodiment of an exemplary method for applying a fluid to at least a portion of a floor surface of a covered area via a moveable fluid application structure. For example, at block 310 of embodiment 300, an apparatus or process may supply a fluid to a moveable fluid application structure suspended substantially above at least a portion of a floor surface of a covered area, at least in part, via a fluid transport structure coupled to a pressurized fluid source, such as described above. Next, at block 320, an apparatus or process may move a moveable fluid application structure substantially above a portion of a floor surface along or via one or more support elements. Next, at block 330, an apparatus or process may apply a fluid to a portion by spraying a fluid from a plurality of holes or nozzles of a moveable fluid application structure as it moves substantially over a portion, at least in part.

In certain embodiments, at block 330, a fluid may be applied such that it may uniformly cover at least a portion of a floor surface of a covered area. For example, as a moveable fluid application structure moves over at least a portion of a floor surface, a relatively uniform application of fluid may be applied. Of course, in other embodiments, at block 330, a fluid may be applied in a non-uniform manner such that different nozzles or holes of a moveable fluid application structure may apply a fluid at various rates or quantities as it moves over at least a portion of a floor surface. This is not meant to imply, however, that a non-uniform application of fluid may necessarily result in any significant gaps or dry spots in a portion; instead, it is intended to suggest that in certain embodiments, a fluid application structure may apply a fluid to a portion equaling or exceeding a moveable (e.g., rotatable, tiltable, etc.) span of the moveable fluid application structure in non-uniform quantities, at least in part.

Certain implementations or embodiments may have a variety of advantages. For example, in certain embodiments, a moveable fluid application structure may allow for more desirable fluid application for a portion of a floor surface. For instance, in a particular embodiment, a relatively uniform spray of fluid may be applied to a particular floor surface. This may be in contrast to overhead or ground fluid application methods which may over or under apply fluids to particular portions of a floor surface.

Of course, an advantage of another embodiment may be that a non-uniform spray of fluid may be applied to a particular floor surface. For example, in an embodiment, one or more nozzles or holes of a fluid application structure may apply a fluid at different rates or quantities. This may be advantageous, for example, to apply more or less fluid to certain portions of a floor surface. For instance, as just an example, in certain contexts, such as in an equine or livestock arena context, outer edges of a floor surface may tend to dry out quicker than more centralized areas of a floor surface due, at least in part, to a higher traffic flow, a closer proximity to the outside air, and/or other reasons, as just an example. Here, it may be advantageous to apply more fluid, or more frequently apply fluid, to outer edges, such as with nozzles with a higher GPM rating, as just an example.

In a particular embodiment, a more desirable or efficient fluid application may result in reduced fluid usage, decreased labor costs or time, or increased usable time for a particular floor surface. For example, in a particular embodiment, fluid applied at particular times, or at particular rates may reduce evaporation, pooling, or down time (unusable time while a fluid may be curing, drying, etc.), as just some examples. This may result in a less costly, healthier, and more environmentally conscious fluid application technique.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" or a "certain embodiment" means that a particular feature, structure, or characteristic described in connection with the embodiment is included in at least one embodiment of claimed subject matter. Thus, the appearances of the phrase "in one embodiment" or "an embodiment" or a "certain embodiment" in various places throughout this specification are not necessarily all referring to the same embodiment. Furthermore, the particular features, structures, or characteristics may be combined in one or more embodiments.

In the preceding description, various aspects of claimed subject matter have been described. For purposes of explanation, specific numbers, systems and/or configurations were set forth to provide a thorough understanding of claimed subject matter. However, it should be apparent to one skilled in the art, having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. An apparatus, comprising:
a moveable fluid application structure comprising a plurality of holes or nozzles adapted to move along a support element positioned substantially above at least a portion of a floor surface of a covered area, wherein said moveable fluid application structure is coupled to one or more cables in communication with one or more motors external to the movable fluid application structure, the moveable fluid application structure being moved in response to movement of the one or more cables by the one or more motors;
a fluid transport structure coupled to said moveable fluid application structure capable of transporting a fluid to said moveable fluid application structure from a fluid source, wherein said moveable fluid application structure is capable, at least in part, of applying said fluid to or around said portion of a floor surface of a covered area via one or more of said plurality of holes or nozzles as said moveable fluid application structure moves substantially over said portion, and at least a portion of said fluid transport structure is supported by a hose reel fixedly mounted to a housing structure, wherein said moveable fluid application structure is moveable relative to said housing structure.

2. The apparatus of claim 1, wherein said fluid comprises at least one of the following: water, pesticides, insecticides, dust control agents, defoliants, or combinations thereof.

3. The apparatus of claim 1, wherein said covered area comprises a covered equine or livestock arena.

4. The apparatus of claim 1, wherein said fluid source comprises a holding tank or pressure tank; wherein said holding tank or pressure tank is operable to couple with one or more pumps to pressurize said fluid.

5. The apparatus of claim 1, wherein said fluid source comprises a localized fluid source; wherein said localized fluid source is capable of being coupled with one or more pumps to increase a pressure or a flow rate of said fluid.

6. The apparatus of claim 1, further comprising a reel capable of extending or retracting said fluid transport structure based, at least in part, on one or more movements of said moveable fluid application structure.

7. The apparatus of claim 1, further comprising a control box coupled to said moveable fluid application structure via the one or more cables, wherein said control box includes one or more components to, at least in part, control one or more operations of said moveable fluid application structure.

8. The apparatus of claim 7, wherein said control box is electrically coupled to one or more programmable circuits or sensors.

9. The apparatus of claim 1, wherein said moveable fluid application structure is coupled to one or more limit switches or time-delay relays.

10. A method, comprising:
supplying a fluid to a moveable fluid application structure suspended substantially above at least a portion of a floor surface of a covered area at least in part via a fluid transport structure coupled to a pressurized fluid source;
moving said moveable fluid application structure substantially above said portion along a support element in response to movement of one or more cables coupled to the moveable fluid application structure, wherein the one or more cables are in communication with one or more motors external to the movable fluid application structure; and
applying said fluid to or around said portion by spraying said fluid from a plurality of holes or nozzles at least in part as said moveable fluid application structure moves substantially over said portion, wherein at least a portion of said fluid transport structure is supported by a hose reel fixedly mounted to a housing structure, wherein said moveable fluid application structure is moveable relative to said housing structure.

11. The method of claim 10, wherein said fluid comprises at least one of the following: water, pesticides, insecticides, dust control agents, defoliants, or combinations thereof.

12. The method of claim 10, wherein said covered area comprises a covered equine or livestock arena.

13. The method of claim 10, wherein a substantially uniform quantity of fluid is sprayed from each of said plurality of holes or nozzles of said moveable fluid application structure.

14. An apparatus, comprising:
a moveable fluid application structure comprising a plurality of nozzles or holes, said moveable fluid application structure capable of moving along one or more support elements positioned substantially above at least a portion of a floor surface of an arena wherein
said fluid application structure is capable of applying a fluid to or around said portion of a floor surface of said arena via one or more of said plurality of holes or nozzles at least in part as said moveable fluid application structure moves substantially over said portion, wherein at least a portion of said fluid transport structure is supported by a hose reel fixedly mounted to a housing structure, wherein said moveable fluid application structure is moveable relative to said housing structure, and
said moveable fluid application structure is coupled to one or more cables in communication with one or more motors external to the movable fluid application structure, the moveable fluid application structure being moved in response to movement of the one or more cables by the one or more motors.

15. The apparatus of claim 14, wherein said fluid comprises at least one of the following: water, pesticides, insecticides, dust control agents, defoliants, or combinations thereof.

16. The apparatus of claim 1, further comprising the one or more motors.

17. The apparatus of claim 16, wherein said one or more motors are further capable of providing said force to tilt, raise, or lower at least a portion of said moveable fluid application structure, at least in part.

18. The apparatus of claim 16, wherein said one or more motors comprises at least one of an electric motor, a hydraulic motor, a pneumatic motor, and/or combinations thereof.

19. The apparatus of claim 16, further comprising a gear box capable of housing said one or more motors, at least in part.

20. The apparatus of claim 16, wherein the one or more motors are capable of providing force to move the moveable fluid application structure along the support element, the force to at least rotate at least a portion of the moveable fluid application structure.

21. The apparatus of claim 1, wherein the support element comprises a single support beam affixed within the covered area.

\* \* \* \* \*